July 10, 1962   A. SCHNELL ET AL   3,043,186
AUTOMATIC CAMERA CONTROLS

Filed Oct. 28, 1959   3 Sheets-Sheet 1

INVENTORS
Albert Schnell
Herbert Reinsch
Ernst Lieser
By Michael S. Striker
Attorney July 10, 1962 A. SCHNELL ET AL 3,043,186
AUTOMATIC CAMERA CONTROLS
Filed Oct. 28, 1959 3 Sheets-Sheet 2

INVENTORS
Albert Schnell
Herbert Reinsch
Ernst Lieser
BY
Michael S. Striker
Attorney July 10, 1962 A. SCHNELL ET AL 3,043,186
AUTOMATIC CAMERA CONTROLS
Filed Oct. 28, 1959 3 Sheets-Sheet 3

INVENTORS.
Albert Schnell
Herbert Reinisch
Ernst Lieser
BY
Michael S. Striker
Attorney United States Patent Office 3,043,186
Patented July 10, 1962

3,043,186
AUTOMATIC CAMERA CONTROLS
Albert Schnell and Herbert Reinsch, Stuttgart, and Ernst Lieser, Stuttgart-Vaihingen, Germany, assignors to Eugen Bauer GmbH, Stuttgart-Unterturkheim, Germany
Filed Oct. 28, 1959, Ser. No. 849,213
Claims priority, application Germany Oct. 29, 1958
8 Claims. (Cl. 88—16)

The present invention relates to cameras.

More particularly, the present invention relates to cameras wherein the diaphragm is automatically set to a predetermined aperture according to the size of a current which is determined by a light-sensitive element. Arrangements of this type are used particularly in cinematographic cameras.

In cameras of the above type it is conventional to provide a diaphragm assembly which will control the aperture through which light reaches the light-sensitive element according to a variable such as, for example, the speed of the film which is used in the camera. Thus, the amount of light which reaches the light-sensitive element will be influenced by the factor of film speed and therefore the exposure of the film in the camera will be regulated in accordance with this variable factor.

However, there are other variables to be taken into consideration, such as, for example, the length of time for the exposure of each of the film frames of the camera, and this second variable factor is conventionally taken care of by including in the electrical circuit which includes the above-mentioned light-sensitive element a variable resistor which can be set according to this second variable of exposure time, for example. Experience has shown, however, that the introduction of this second variable in an arrangement of the type described above is not always carried out with the necessary accuracy because, for example, the amount of current in the circuit may be extremely low and the settings of the variable resistor ordinarily carried out by means of a sliding contact are not precisely determined so that inaccuracies occur particularly where small amounts of current are involved. The adjusting of the variable resistor is difficult in order to take into consideration the changing in the characteristics of the light-sensitive element resulting from the length of use thereof, and as a result of this latter factor the accuracy of the assembly also is undesirably influenced.

The additonal factors, instead of being introduced through a variable resistor, may be introduced in other ways such as by providing a pivotal mounting for the measuring mechanism which determines the setting of the camera diaphragm, but this latter type of construction requires considerable space in the interior of the camera housing as well as such elements as flexible electrical leads, and all of these latter considerations work against the provision of a camera which is as small and inexpensive as possible. Furthermore, it is not a simple matter to provide a bearing which will reliably protect the relatively large mass of the measuring instrument against shock or the like, and where the measuring instrument is directly connected wtih the diaphragm blades to set the latter, the pivotal mounting of such an instrument can often be carried out only with extreme difficulty, if at all.

It is therefore a primary object of the present invention to avoid all the drawbacks discussed above by providing a camera which will be capable of introducing variable factors into the camera for automatically setting the same without any of the drawbacks referred to above, such as the disadvantages which result from variable resistors of pivotal mountings of the light measuring mechanism.

Another object of the present invention is to provide a structure capable of setting a pair of variables into the camera in a manner entirely independently of each other and in a manner which will enable any desired combination of the two variables to be set into the camera without in any way interfering with each other.

Also, the objects of the invention include the provision of a camera subassembly which can be separately manufactured and at the same time assembled very easily with the remainder of the camera.

Another object of the present invention is to provide a structure which is composed of simple, rugged elements which are very reliable in operation.

With the above objects in view the present invention includes in a camera a light-sensitive element which participates in the automatic setting of the camera. An optical means is provided for directing light to this light-sensitive element, and a pair of diaphragm means cooperate with the optical means for controlling the size of the opening through which light passes along the optical means to the light-sensitive element. This pair of diaphragm means of the invention operate entirely independently of each other and are capable of assuming any desired combination of positions without in any way interfering with each other. Manually operable means respectively cooperate with the pair of diaphragm means for setting the latter according to a pair of variable factors which must be taken into consideration in the setting of the camera. For example, one of the manually operable means may set one of the diaphragm means according to the speed of the film which is used in the camera, while the other of the manually operable means cooperates with the other diaphragm means to set the latter according to the speed of operation of the camera. Because the pair of diaphragm means operate entirely independently of each other and can have their settings superimposed upon each other without any interference, it is possible to introduce such a pair of variables into the camera without any of the disadvantages referred to above. The structure of the invention requires no electrical elements such as variable resistors which can result in faulty operation, and in addition the structure of the invention not only operates with a high accuracy, at the same time it uses relatively simple mechanical devices and is extremely compact so that it requires only a small amount of space.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
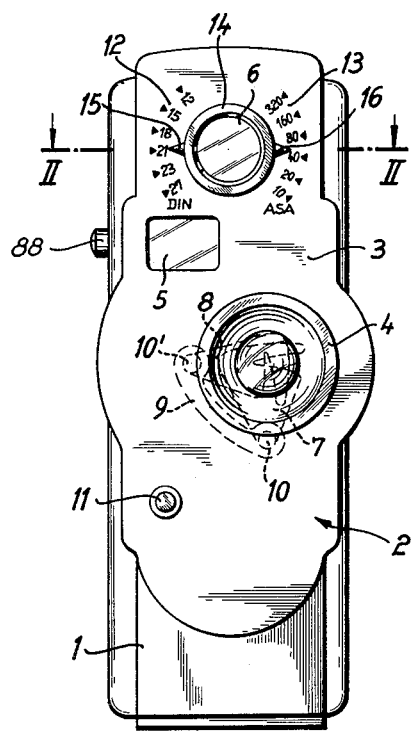
FIG. 1 is a diagrammatic front view of a cinematographic camera provided with the structure of the invention.

Referring first to FIG. 1, the camera illustrated therein includes a main housing 1 which carries a front section 2, this front section 2 of the camera including a front wall 3 which forms the front wall of the camera. This front section 2 of the camera includes the camera objective 4 as well as a window 5 of the view finder of the camera. In addition, the camera is provided at the front section 2 with an optical means 6 through which light enters in a manner described below to a light-sensitive element such as an electrical resistor whose resistance varies with the amount of light which reaches this element. Such an electrical resistor may be made of cadmium sulfide, for example. As is shown in dotted lines in FIG. 1, the camera includes a diaphragm made up of a pair of blades 7 and 8 which will provide an exposure aperture determined by the amount of light which reaches the above light-sensitive element through the optical means 6. This light-sensitive element in accordance with the amount of light which reaches the same will provide a greater or lesser current which will act through the current measuring means 9 to turn the pair of blades 7 and 8 respectively about the turning axes determined by the pivots 10 and 10' so as to control in this way the exposure aperture of the camera. A release plunger 11 is accessible to the operator and extends through the front section 2 of the camera for starting and stopping the operation of the latter. A pair of scales 12 and 13 are arranged around the optical means 6, these scales 12 and 13 being scales of different film speeds according to a pair of different systems. A ring 14 surrounds the optical means 6 and is freely turnable with respect to the latter, and this ring 14 carries a pair of diametrically opposed index projections 15 and 16 respectively cooperating with the scales 12 and 13 for setting the ring 14 at angular positions determined by the speed of the film which is set into the camera.

Figure 2:
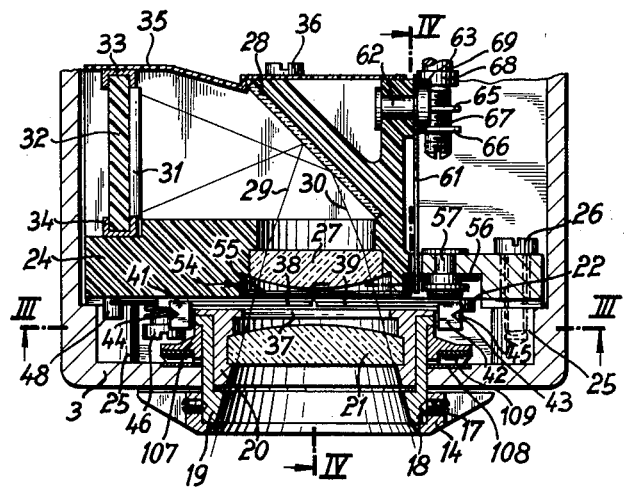
FIG. 2 is a fragmentary sectional plan view on an enlarged scale as compared to FIG. 1 taken along the line II—II.

As may be seen from FIG. 2, the ring 14 is fixed by means of a pair of set screws 17 to the exterior of a rotary adjusting ring 19 in the form of an elongated tube, the tube 19 being formed in its exterior surface with an annular groove 18 which receives the ends of the screws 17. The optical means 6 includes a lens tube 20 and the ring or tube 19 is carried by the lens tube 20. This lens tube 20 carries a lens 21 of the optical means and this lens 21 closes off the optical means from the outer atmosphere. At its inner end, the lens tube 20 is provided with an outwardly directed annular flange 22 which is fixed by means of a pair of diametrically opposed screws 23 to a housing 24 of electrically non-conductive material which carries the optical means 6. The heads of the screws 23 are visible in FIG. 3. The front wall 3 of the section 2 of the camera is provided with a plurality of axially bored portions 25 which receive the screws 26, respectively, and the housing 24 is formed at its front wall with openings through which the screws 26 respectively extend into threaded engagement with the portions 25 of the front wall 3, so that the screws 26 serve to fix the housing 24 to the front wall 3 at the inner side of the latter.

The optical means 6 include in addition to the lens tube 20 and the lens 21 an iner lens 27 carried directly by the front wall of the housing 24 in a suitable opening thereof, and both of these lenses form an image-forming objective. The housing 24 carries in its interior in a plane inclined to the optical axis a reflector 28 which directs light passing through the objective along the optical axis of the latter to the left, as viewed in FIG. 2, and this light which is directed in this way to the left reaches the light-sensitive element 31 which is in the form of an electrical resistor whose resistance will vary with the amount of light, this element 31 being made, for example, of cadmium sulfide, as mentioned above. Thus, when this element 31 is included in an electrical circuit which derives its current from a separate source such as a battery, the amount of current which flows through the circuit will be determined by the amount of light which reaches the element 31. The limiting rays 29 and 30 of the light which moves through the optical means 6 to the reflector 28 and from the latter to the light-sensitive element 31 are indicated in FIG. 2. The light-sensitive element 31 is carried by a wall 32 of the housing 24, and this light-sensitive element is located between a pair of electrically conductive metal strips 33 and 34 which engage the element 31 and extend through the wall of the housing 24 in the manner shown in FIG. 2 so as to be accessible at the exterior of the housing 24 to permit electrical connections to be made with the resistor 31 through these strips 33 and 34. Thus, the wall 32 of the housing 24 serves as a carrier for the resistor 31. An electrically non-conductive rear cover plate 35 is fixed to the housing 24 by means of a screw 36, for example, and this cover 35 maintains the strip 33 as well as the reflector 28 fixed to the housing 24 in the manner shown in FIG. 2, and in addition the cover 35 tightly closes the housing 24 so that the only possible entry of light into the housing 24 is through the optical means 6. Except for the light which enters through the optical means 6, it is impossible for any additional light or for any air, dust, or the like to enter into the housing 24.

Figure 3:
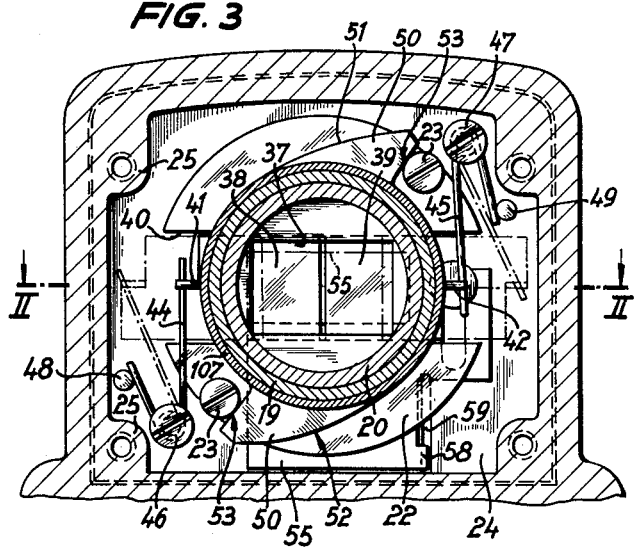
FIG. 3 is a section taken along line III—III of FIG. 2.

In the principal plane of the objective 21, 27 is located the rear wall of the lens tube 20, and this rear wall of the lens tube 20 is formed with a rectangular cutout 37 the configuration of which is clearly visible in FIG. 3. It is through this cutout the light passes along the optical axis of the objective 21, 27. A first diaphragm means cooperates with the rectangular cutout 37 to control the size of the opening through which the light passes, and this first diaphragm means includes a pair of rectangular diaphragm blades 38 and 39. The rear wall of the lens tube 20 is formed along the upper and lower edges of the opening 37 with a pair of horizontally extending guides extending completely through the flange 22 and forming a pair of lateral cutouts in the latter, and these guides form a guide means which serves to guide the pair of diaphragm blades 38 and 39 of the first diaphragm means for movement toward and away from each other. Thus, these guides formed in the rear wall of the lens tube 20 form a guide path 40 for the pair of diaphragm blades 38 and 39. At its left end, the diaphragm blade 38 is formed with a tongue 41 which is perpendicular to the rest of the blade 38, and at its right end blade 39 is formed with a tongue 42. Each of these tongues is formed with a substantially V-shaped notch 43 shown most clearly in FIG. 2, and a pair of wire springs 44 and 45 respectively have their free ends located in the notches 43 of the tongues 41 and 42. The front wall of the housing 24 carries a pair of screws 46 and 47 around which the springs 44 and 45 are respectively coiled with free ends of these springs respectively engaging the stationary pins 48 and 49 carried by the front wall of the housing 24, and with the opposite free ends of these springs 44 and 45 respectively located in the notches 43 of the tongues 41 and 42, respectively, as indicated in FIGS. 2 and 3. Thus, the springs 44 and 45 serve to urge the diaphragm blades 38 and 39 toward each other along the guide means formed in the rear wall of the lens tube 20, and it will be noted that the blades 38 and 39 of this first diaphragm means of the invention are located in a plane perpendicular to the optical axis and moreover the path 40 along which the blades 38 and 39 move extends perpendicularly with respect to the optical axis.

At its inner, rear end the tube or ring 19 is provided with a pair of camming portions 50 diametrically opposed to each other and extending outwardly from the rear flange of element 19, this rear flange being clearly indicated in FIG. 2 in engagement with the rear flange 22 of the lens tube 20. The pair of camming projections 50 of the ring 19 are respectively provided with a pair of diametrically opposed curved camming edges 51 and 52 as well as with a pair of diametrically opposed radially extending stop edges 53. The ring is shown in FIG. 3 with the stop edges 53 respectively engaging the head ends of the screw 23 which thus serve to determine an end position of the ring 19. When the ring 19 is turned in a counterclockwise direction, as viewed in FIG. 3, by the operator, the operator engaged in turning the ring 14 for this purpose, the camming edges 51 and 52 will respectively come into engagement with the tongues 41 and 42 to move the blades 38 and 39 respectively away from each other during the continued turning of the ring 19 in this counterclockwise direction, as viewed in FIG. 3, and the springs 44 and 45 serve to maintain the tongues 41 and 42 in engagement with the camming edges 51 and 52, respectively.

The second diaphragm means of the invention is formed by a single plate 55 which is located also in a plane perpendicular to the optical axis of the optical means 6, this plate or blade 55 being located directly behind and adjacent to the pair of blades 38 and 39 of the first diaphragm means. The front wall of the housing 24 is formed directly behind blades 38 and 39 with a cutout 54 in which the second diaphragm means 55 is accommodated. The plate 55 is stepped at its right end, as viewed in FIG. 2, and the stepped portion 56 of the plate 55 is formed with a vertically extending slot which receives a stationary guide pin 57 carried by the front wall of the housing 24, so that this pin 57 cooperates with the slot to guide the diaphragm 55 for vertical movement. At its lower right end, as viewed in FIG. 3, the blade 55 is provided with a rearwardly directed projection 58 which is located in a vertically extending groove 59 formed in the front surface of the housing 24, so that the projection 58 and the groove 59 also serve to guide the diaphragm blade 55 for vertical movement. It will be noted that while the second diaphragm means 55 also moves perpendicularly to the optical axis, the direction of the movement of the second diaphragm means 55 is perpendicular to the direction of movement of the first diaphragm means 38, 39.

Figure 4:
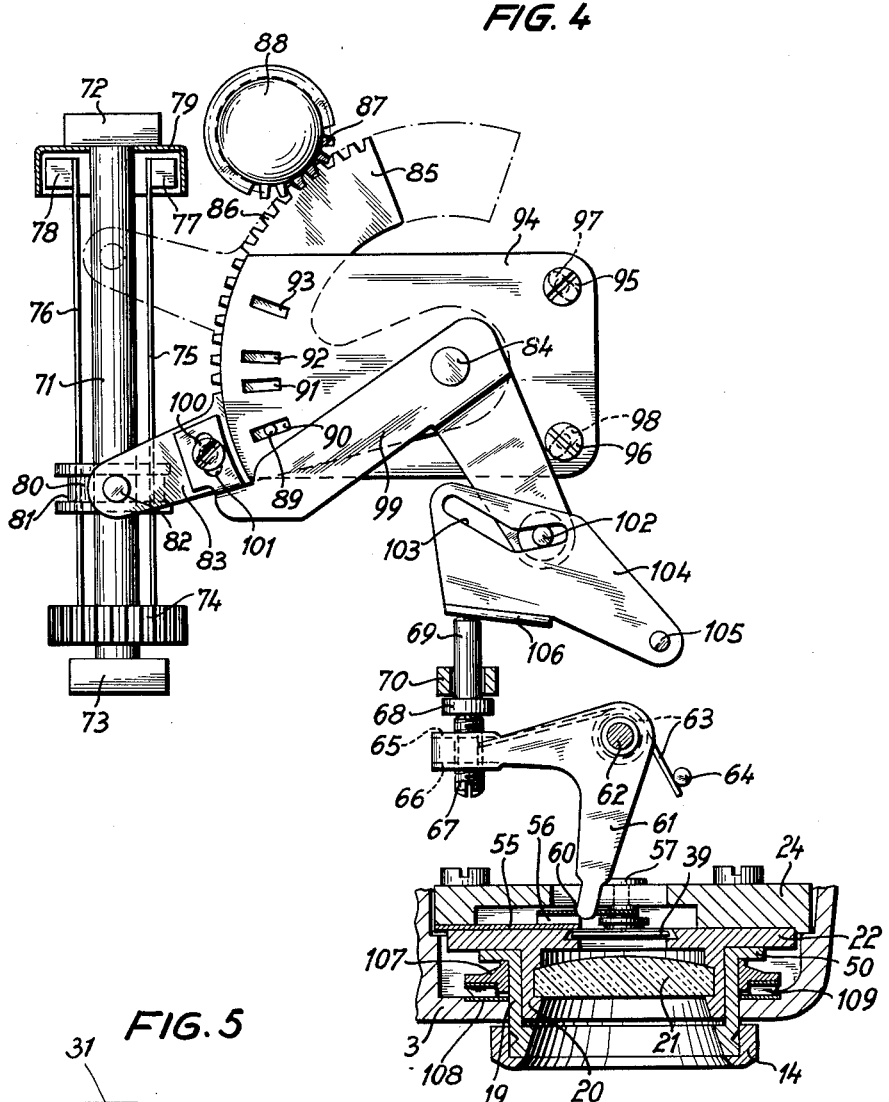
FIG. 4 is a section taken along line IV—IV of FIG. 2.

As is shown most clearly in FIG. 4, the diaphragm blade 55 is formed at its stepped portion 56 with a slot 60 which receives a free end of a bell crank 61 which is pivotally carried by a pivot pin 62 which is directly carried by the right wall of the housing 24, as viewed in FIG. 2. This pivot pin 62 carries a wire spring 63 which is wound in part around the pin 62, which has one free end engaging a stationary pin 64 carried by the housing 24 and shown in FIG. 4, and which has an opposite free end engaging a tongue 65 which extends to the right, as viewed in FIG. 2, from the bell crank 61 at the end of latter distant from the diaphragm blade 55. The bell crank 61 is provided with a second tongue 66 which extends parallel to the tongue 65, and these tongues 65 and 66 are formed with a pair of aligned openings which serve to threadedly carry the adjusting screw 67. The spring 63 by engagement with the tongue 65 urges the bell crank 61 in a clockwise direction, as viewed in FIG. 4, around the pivot pin 62. Thus, the spring 63 serves to urge the blade 55 to its lower end position shown in FIG. 3.

As may be seen from FIG. 4, the adjusting screw 67 is pressed by the spring 63 against the head end 68 of an elongated motion transmitting member 69 which is guided for longitudinal movement by a sleeve 70 which is carried by the camera.

The camera is provided with a speed governor, and this governor is shown in FIG. 4 and includes the elongated shaft 71 which is supported for rotation about its axis by a pair of stationary bearings 72 and 73 of the camera. The shaft 71 fixedly carries a pinion 74 which meshes with the drive means of the camera so that in this way the governor shaft 71 is rotated about its axis. A pair of elongated leaf springs 75 and 76 extend parallel to the shaft 71 and are fixed at one end to the pinion 74 to rotate with the latter, and at their ends which are distant from the pinion 74 the leaf springs 75 and 76 respectively carry governor weights 77 and 78 which by centrifugal force tend to move outwardly away from the axis of the shaft 71 during rotation of the latter. These weights 77 and 78 are located within a stationary brake drum 79 which is fixedly carried by the stationary bearing 72, for example, and by rubbing against the inner annular surface of the brake drum 79, the weights 77 and 78 are capable of controlling the speed of operation of the camera. The pair of leaf springs 75 and 76 respectively extend through openings which are formed in an adjusting ring 80 and which extend axially through the latter, the shaft 71 extending through the adjusting ring 80 and this adjusting ring 80 is capable of shifting axially along the shaft 71 while being constrained by the leaf springs 75 and 76 to rotate therewith. The adjusting ring or sleeve 80 is formed at its exterior with an annular groove 81 which receives a pin 82. It is apparent that the governor will be adjusted according to the axial position of the sleeve 80 along the shaft 71. The closer the sleeve 80 is to the pinion 74, the longer will be the portions of the leaf springs 75 and 76 extending freely beyond the sleeve 80 and carrying the weights 77 and 78 so that these weights can easily move outwardly into engagement with the brake drum and thus the governor will set the camera to operate at a relatively low speed at this time. On the other hand, as the sleeve 80 is moved closer and closer to the drum 79, the free end portions of the spring 75 and 76 which extend beyond the sleeve 80 toward the drum 79 become shorter, and thus the shaft 71 must rotate at increasingly high speeds in order to place the weights 77 and 78 in engagement with the drum 79, and thus when the sleeve 80 is located relatively close to the drum 79 the camera will be set to operate at a relatively high speed.

The pin 82 which extends into the groove 81 of the sleeve 80 is carried by the free end of a lever 85 which has a gear sector 86 meshing with a pinion 87 capable of being manually turned by engagement with the knob 88. Thus, the operator can grasp the knob 88 which is located at the exterior of the left side of the camera as viewed in FIG. 1 in order to turn the pinion 87 and thus turn the gear sector 86 of the lever 85 so as to turn the latter, this lever 85 being carried by the stationary pivot pin 84 of the camera. Therefore, by turning the knob 88 the operator can place the lever 85 in different angular positions which will determine the axial position of the sleeve 80 on the shaft 71 and which will thus determine the speed of operation of the camera. It will be noted that the pin 82 is carried by the free end portion 83 of the lever 85. The knob 88 is of course fixedly connected with the pinion 87 so as to turn the latter and the pinion 87 as well as the knob 88 are turnably supported by any suitable bearing of the camera.

A releasable detent means is provided for releasably holding the lever 85 in any one of a selected number of angular positions, and this detent means includes a ball member 89 fixed to the lever 85 so as to turn therewith and capable of selectively entering any one of a plurality of cutouts 90—93 formed in a springy plate 94 which is fixed to the camera at a stationary wall of the latter by a pair of screws 95, 96 which respectively extend through the oppositely inclined slots 97 and 98 formed in the springy plate 94, and it will be noted that the pivot pin 84 extends through the springy plate 94 which extends over the lever 85 in the manner shown in FIG. 4, so that the pin also serves to support the springy plate 94.

Motion is transmitted from the lever 85 through a motion transmitting member in the form of a bell crank 99 carried by the pivot pin 84 so that the turning axis of the bell crank 99 coincides with that of lever 85. The lever 99 is adjustably fixed with the portion 83 of the lever 85 through an adjustable connecting means which includes the screw member 100 threadedly carried by the portion 83 of the lever 85 and extending through the elongated slot 101 of the lever 99, so that the screw 100 may be tightened for releasably fixing the levers 85 and 89 to each other at given angular positions with respect to each other. The end of the lever 99 which is opposed to the slot 101 thereof fixedly carries a pin 102 which extends into the elongated slot 103 formed in a third lever 104 which is turnably supported by stationary pivot pin 105 which extends parallel to the pivot pin 84, and this third lever 104 has a tongue 106 which extends perpendicularly to the plane of FIG. 4 and which is engaged by the free end of the elongated motion transmitting member 69, the spring 63 acting through the lever 61 and the screw 67 to maintain the member 69 in engagement with the portion 106 of the lever 104.

As may be seen from FIGS. 2 and 4, a ring 107 surrounds the ring 19 which is freely turnable with respect to the ring 107, and a steel washer 108 is located against the inner surface of the front wall 3, this wall 3 being made of a light metal such as aluminum, for example. A spring means 109 is located between and engages the rings 107 and 108 and this spring 109 forms together with the rings 107 and 108 a spring means which urges the ring 19 rearwardly along the optical axis so that the rear flange 50 of the ring 19 is in this way maintained in engagement with the flange 22 of the lens tube 20. Moreover, this spring means, while it permits manual turning of the ring 19 to any desired angular position indicative of the speed of the film which is introduced into the camera, at the same time prevents any turning of the ring 19 except turning made by the operator, so that the ring 19 will be reliably maintained in the angular position to which it is set by the operator through the spring means 107—109. The annular spring 109 may take the form of an annular springy corrugated element which extends almost through 360° so that the wavy corrugations thereof may be flattened to some extent between elements 107 and 108 beyond the curvature which these wavy corrugations have when the spring 109 is not compressed, and in this way the spring 109 acts through its wavy corrugations to urge the ring 107 away from the washer 108 and thus maintain the flange 50 against the flange 22. Of course, the screw heads 23 are located outwardly beyond the outer periphery of the flange 50 except for the camming projections of the latter, and thus the heads of the screws 23 do not in any way interfere with the turning of the ring 19.

In the position of the parts which is illustrated in FIG. 3 the rectangular opening 37 of the optical means 6 is almost completely closed by the pair of blades 38 and 39 of the first diaphragm means. This corresponds to the end position of the ring 19 where it is set for the smallest possible film speed. Before making the exposure with the camera, the index 15 or the index 16 is set at the scale 12 or 13, respectively, according to the speed of the film which is used in the camera. The cams 51 and 52 thus shift the pair of blades 38 and 39 to a predetermined extent away from each other and thus permit the amount of light which reaches the variable resistor 31 to increase in accordance with the particular speed of the film which is set into the camera. The extreme outer end positions of the blades 38 and 39 where these blades are set at their maximum openings is indicated in dot-dash lines in FIG. 3.

With the knob 88 the camera is set to operate at the desired speed. The detent ball 89 of the lever 85 snaps into a desired one of the detent openings 90—93 and thus the axial position of the sleeve 80 is determined. Simultaneously, the bell crank 99 is turned through a given angle and its pin 102 rides along the slot 103 so as to turn the third lever 104 through a predetermined angle. The turning of this lever 104 is transmitted through member 69 to the bell crank 61 which thus raises the second diaphragm means 55 into a position covering the opening 37 to an extent determined by the speed of operation set into the camera through the knob 88, and thus it will be seen that the second diaphragm means 55 controls the size of the opening through which light passes to the resistor 31 entirely independently of the first diaphragm means 38, 39 and at the same time the two diaphragm means then have any desired combination of positions with respect to each other without any possible interference. In this way, which is to say by independent control of the opening through which light reaches the variable resistor 31, the factor of the speed of operation of the camera can be set into the structure which determines the position of the diaphragm 7, 8. The upper end position of the second diaphragm 55 is shown in dot-dash lines in FIG. 3.

The structure is shown in FIGS. 3 and 4 in the position it takes for the smallest possible speed of operation of the camera, and in this position the blade 55 almost completely uncovers the opening 37.

Thus, the pair of diaphragm means 55 and 38, 39 will serve to determine the size of the opening through which light reaches the variable resistor 31, and it will be noted that the size of this opening in accordance with the speed of operation of the camera is superimposed on the size of this opening in accordance with the film speed without any possible conflict.

Figure 5:
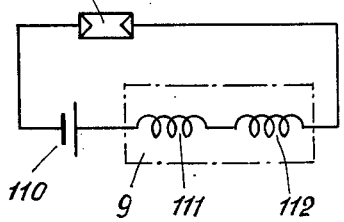
FIG. 5 shows a wiring diagram.

Thus, the speed of the film which is set into the camera as well as the speed of operation of the camera, which is to say the exposure time at each of the frames of the film strip, influence in the same way the amount of light which reaches the light-sensitive element 31. Inasmuch as the pair of diaphragm means 38, 39 and 55 are located in the principal plane of the objective 21, 27, the amount of light which reaches the resistor 31 will change uniformly while maintaining a uniform distribution over the resistor 31. This resistor 31 is located in an electrical circuit (FIG. 5) with a battery 110 whose current acts on coils 111, 112 of the device 9 so as to determine the angle through which the blades 6 and 7 are turned. When the optical means 6 is provided with a relatively large opening, then a relatively large amount of light will reach element 31 and thus the resistor 31 will allow a relatively large current to pass so that the diaphragm blade 7 and 8 will provide a small exposure aperture even when there is relatively little brightness. This is the setting which is provided in the case where the speed of the film is relatively high and the speed of operation of the camera is relatively slow. At the opposite extreme, the diaphragm 7, 8 will provide a relatively large opening under the same lighting conditions. That is to say, when a film of lower speed is set into the camera, thus necessitating a greater opening provided by the diaphragm 38, 39 and when a speed of operation of the camera of a relatively higher value is set by the operator, then the structure will operate automatically to set the blades 7 and 8 at positions which will give a larger exposure aperture for the same lighting conditions. Of course, these settings are made only when the camera is initially adjusted. During operation of the camera, the parts will remain in their adjusted positions and then the variations in the intensity of light around the camera and the subject being photographed will of course vary the amount of light reaching element 31 and thus will automatically adjust the diaphragm 7, 8 according to the varying lighting conditions.

The above-described structure is so made that the housing 24 with the structure carried by the latter inside and outside thereof forms a separate subassembly which can be manufactured entirely separately from the rest of the camera and which is set as a unit into the camera. This unit cannot only be separately manufactured, but it also can be separately adjusted and tested. It is therefore of particular advantage that the resistor 31 is not located in a plane extending directly across the optical axis of the optical means 6, but rather to the side of the optical axis in a plane parallel thereto. As a result of this latter feature, the size of the assembly along the optical axis of the optical means 6 is maintained at a minimum so that the entire front section 2 of the camera will extend forwardly from the main housing 1 thereof through only a relatively short distance.

The bell crank 61 forms a part of the unit which includes the housing 24 and is carried by the latter at the exterior thereof. The parts 68—106 form a part of the camera separate from this unitary subassembly, and thus the parts 68—106 are located within the main housing 1 of the camera and are independent of the subassembly formed by the housing 24 and the parts carried thereby. Variations in the manufacturing tolerances particularly at the connections between the main housing 1 and the forward housing 2 can be compensated by adjusting the screw 67 which is carried by the bell crank 61 so that in this way the diaphragm 55 will always be accurately located at the proper elevation in spite of variations in the manufacturing tolerances. Thus, as a result of the screw 67 it is possible to set the blade 55 at its proper position when the subassembly is joined to the rest of the camera structure.

It may be necessary in order to accurately adjust the camera operating speeds to turn the springy plate 94 about the pivot pin 84, and it will be noted that the oppositely inclined cutouts 97 and 98 extend substantially along arcs of a circle whose center is in the axis of the pivot pin 84, so that by loosening the screws 95 and 96, it is possible to adjust the angular position of the springy plate 94 and thus set the camera operating speeds very accurately. The influence of such adjustment of the springy plate 94 on the structure which actuates the diaphragm 55 is cancelled out and entirely compensated by the possibility of turning the bell crank 99 upon loosening of the screw 100 to the predetermined angular position with respect to the lever 85. In this way the possibility of undesirably influence the position of the diaphragm 55 when the angular position of the plate 94 is adjusted can be eliminated.

Of course, while the diaphragms 55 and 38, 39 have been described above and shown in the drawings in the form of substantially flat plates, these diaphragms can take other forms and may have the structure, for example, of iris diaphragms. Thus, where an iris diaphragm is used an opening provided by the latter will depend upon a pair of entirely independent movements. For example, the iris diaphragm will include a supporting ring which carries several blades and supports them for turning movement as well as an adjusting ring which turns with respect to the supporting ring so as to turn these blades with respect to the supporting ring and thus set the opening of the diaphragm. With an arrangement of this type one of the variable factors can be connected to the supporting ring to turn the latter with respect to the adjusting ring, while the other of the variable factors can act on the adjusting ring to turn the latter with respect to the supporting ring, and in this way a pair of entirely independent factors can be brought to operate the single iris diaphragm for producing results similar to those described above. It is preferred, however, to use the diaphragm structure described above and shown in the drawings because of its greater simplicity and because of the relatively small number of parts required and compact assembly provided.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention, as defined in the claims.

What is claimed as new and desired to be secured by Letters Patent is:

1. In a camera, in combination, a light-sensitive element capable of participating in the automatic control of the setting of the camera; an objective cooperating with said element for directing light toward the latter, said objective having a principal plane; first and second diaphragm means located at said principal plane of said objective for controlling the aperture through which light passes along the optical axis of said objective toward said light-sensitive element, said first and second diaphragm means operating entirely independently of each other and being capable of assuming any desired combination of positions without interfering with each other; and first and second manually operable means respectively cooperating with said first and second diaphragm means for setting the latter entirely independently of each other according to a pair of variable factors which must be taken into consideration in the setting of the camera.

2. In a camera, in combination, a light-sensitive element which participates in the automatic setting of the camera; first and second diaphragm means cooperating entirely independently of each other with said light-sensitive element for controlling the amount of light which reaches the same, said first and second diaphragm means being capable of assuming any desired combination of positions without interfering with each other; first manually operable means cooperating with said first diaphragm means for setting the latter only according to the speed of the film which is set into the camera; second manually operable means cooperating with said second diaphragm means for setting the latter only according to the operating speed of the camera; governor means for controlling the operating speed of the camera, said second manually operable means regulating said governor means simultaneously with the setting of said second diaphragm means; a camera diaphragm for controlling the exposure aperture of the camera; and automatic means responding to the impingement of light on said light-sensitive element and cooperating with said camera diaphragm for automatically setting the latter.

3. In a camera, in combination, a light-sensitive element which participates in the setting of the camera; optical means having a principal plane and cooperating with said element for directing light to the latter; a pair of diaphragm elements cooperating with said optical means for regulating the size of the opening through which light passes along the axis of said optical means to said light-sensitive element; first guide means cooperating with said pair of diaphragm elements for guiding the latter for movement toward and away from each other along a given path; a third diaphragm element located in all its positions in a plane parallel to and closely adjacent to a plane in which said pair of diaphragm elements are located, both of said planes being normal to the optical axis of said optical means at said principal plane thereof and said path of movement of said pair of diaphragm elements extending perpendicularly with respect to said optical axis; second guide means cooperating with said third diaphragm element for guiding the latter for movement perpendicularly to the optical axis along a second path perpendicular to said first path; first manually operable means cooperating with said pair of diaphragm elements for regulating the movement of said elements along said first path controlled by said first guide means and for determining the distance between said pair of diaphragm elements according to the speed of the film which is used in the camera; second manually operable means cooperating with said third diaphragm element for determining the position thereof along said second path according to the speed of movement of the film in the camera; a camera diaphragm for determining the exposure aperture of the camera; and automatic means responding to the impingement of light on said light-sensitive element and cooperating with said camera diaphragm for automatically setting the latter.

4. In a camera, in combination, a light-sensitive element which participates in the setting of the camera; optical means having an optical axis and a principal plane and cooperating with said light-sensitive element for directing light to the latter; a pair of substantially flat diaphragm elements located in said principal plane normal to said optical axis and cooperating with said optical means for controlling the size of the openings through which light passes along said axis to said light-sensitive element; first guide means cooperating with said pair of diaphraghm elements for guiding the latter toward and away from each other along a path extending perpendicularly with respect to the optical axis in said plane; annular manually turnable cam means coaxially surrounding the axis of said optical means and including a pair of diametrically opposed camming portions cooperating with said pair of diaphragm elements for simultaneously moving the latter toward and away from each other to positions along said path which are indicative of the speed of the film set into the camera; a third diaphragm element located in all its positions in a second plane parallel to and closely adjacent to the plane in which said pair of diaphragm elements are located; second guide means cooperating with said third diaphragm element to guide the latter for movement in said second plane in a direction perpendicular to the direction of movement of said pair of diaphragm elements toward and away from the optical axis so that said third diaphragm element also controls the size of the opening through which light passes along said optical axis to said light-sensitive element; and manually operable means cooperating with said third diaphragm element for setting the latter at a position along said second path which is indicative of a variable different from the film speed.

5. In a camera, in combination, a housing fixed to a part of the camera; optical means carried by said housing for directing light to the interior thereof; a light-sensitive electrical resistor carried by said housing in the interior thereof in a plane parallel to but located to one side of the optical axis of said optical means; reflector means carried by said housing in a plane inclined to said optical axis and extenidng across the latter for directing light extending along said optical axis through said optical means to said resistor; a pair of diaphragm means and a pair of guide means respectively cooperating therewith for guiding the same for movement, said pair of diaphragm means being located respectively in planes perpendicular to said optical axis and cooperating with said optical means for controlling, independently of each other, the size of the opening of said optical means through which light passes along said optical axis to said reflector, said guide means as well as said pair of diaphragm means being carried by said housing; and a pair of moving means respectively cooperating with said pair of diaphragm means for moving the latter, both of said moving means also being carried by said housing, said optical means including a tube carried by said housing and a lens carried by said tube in the interior of the latter, said tube having a flange formed with cutouts whose edges serve as one of said guide means and one of said moving means including a ring turnably carried by said tube at the exterior thereof.

6. In a camera, in combination, a camera front wall having outer and inner sides; a housing fixed to said camera front wall at said inner side thereof; optical means carried by said housing for directing light along the optical axis of said optical means into the interior of said housing; a light-sensitive element which participates in the setting of the camera, said element being carried by said housing in the interior thereof in a plane located to one side of and parallel to said optical axis; a reflector carried by said housing in the interior thereof in a plane inclined to said optical axis, said reflector extending across said optical axis for directing light which extends through said optical means to said light-sensitive element; an adjusting ring turnably carried by said optical means for turning movement around said optical axis thereof, said optical means including an annular flange engaged by said adjusting ring, said ring having an inner end formed with a flange which engages said flange of said optical means; and spring means located between said flange of said adjusting ring and said camera wall for urging the flange of said adjusting ring into engagement with the flange of said optical means.

7. In a camera, in combination, a camera front wall having outer and inner sides; a housing fixed to said camera front wall at said inner side thereof; optical means carried by said housing for directing light along the optical axis of said optical means into the interior of said housing; a light-sensitive element which participates in the setting of the camera, said element being carried by said housing in the interior thereof in a plane located to one side of and parallel to said optical axis; a reflector carried by said housing in the interior thereof in a plane inclined to said optical axis, said reflector extending across said optical axis for directing light which extends through said optical means to said light-sensitive element; an adjusting ring turnably carried by said optical means for turning movement around said optical axis thereof, said optical means including an annular flange engaged by said adjusting ring, said ring having an inner end formed with a flange which engages said flange of said optical means; and spring means located between said flange of said adjusting ring and said camera wall for urging the flange of said adjusting ring into engagement with the flange of said optical means, and a steel ring carried by said camera front wall at said inner side thereof and engaged by said spring means.

8. In a camera, in combination, a light-sensitive element which participates in the automatic setting of the camera; a subassembly including a housing in which said light-sensitive element is located; optical means carried by said housing for directing light to said light-sensitive element, said optical means including a lens tube; a pair of diametrically opposed screws fixing said lens tube to said housing and having exposed head ends; and an adjusting ring carried by said tube for turning movement thereon, said ring having a pair of diametrically opposed camming portions extending therefrom and said head ends of said screws cooperating with said camming portions to determine an end position of said adjusting ring.

References Cited in the file of this patent
UNITED STATES PATENTS

| | | |
|---|---|---|
| 1,897,762 | Morsbach | Feb. 14, 1933 |
| 1,935,327 | Morsbach et al. | Nov. 14, 1933 |
| 2,051,061 | Tonnies | Aug. 18, 1936 |
| 2,184,016 | Mihalyi | Dec. 19, 1939 |
| 2,256,208 | Leitz | Sept. 16, 1941 |
| 2,518,717 | Rath | Aug. 15, 1950 |
| 2,754,735 | Meyer | July 17, 1956 |
| 2,838,985 | Burger | June 17, 1958 |
| 2,918,854 | Malek | Dec. 29, 1959 |

FOREIGN PATENTS

| | | |
|---|---|---|
| 870,181 | France | Mar. 4, 1942 |